(12) United States Patent
Kim et al.

(10) Patent No.: US 11,912,109 B2
(45) Date of Patent: Feb. 27, 2024

(54) FLUSH GLASS APPARATUS

(71) Applicants: HYUNDAI MOTOR COMPANY, Seoul (KR); KIA MOTORS CORPORATION, Seoul (KR); Webasto Korea Holdings Ltd., Ulsan (KR)

(72) Inventors: Jeong Hyeon Kim, Suwon-si (KR); Seong Min Gwak, Yangsan-si (KR); Su Yun Choi, Ulsan (KR)

(73) Assignees: Hyundai Motor Company, Seoul (KR); Kia Motors Corporation, Seoul (KR); Webasto Korea Holdings Ltd., Ulsan (KR)

( * ) Notice: Subject to any disclaimer, the term of this patent is extended or adjusted under 35 U.S.C. 154(b) by 241 days.

(21) Appl. No.: 17/036,679

(22) Filed: Sep. 29, 2020

(65) Prior Publication Data
US 2021/0245592 A1    Aug. 12, 2021

(30) Foreign Application Priority Data

Feb. 6, 2020  (KR) .......................... 10-2020-0014038

(51) Int. Cl.
| | |
|---|---|
| *B60J 10/00* | (2016.01) |
| *B60J 10/25* | (2016.01) |
| *B60J 1/00* | (2006.01) |
| *B60J 10/79* | (2016.01) |
| *B60J 1/18* | (2006.01) |
| *B60J 1/16* | (2006.01) |

(52) U.S. Cl.
CPC ............... *B60J 10/25* (2016.02); *B60J 1/004* (2013.01); *B60J 10/79* (2016.02); *B60J 1/16* (2013.01); *B60J 1/1853* (2013.01)

(58) Field of Classification Search
CPC ............. B60J 1/16; B60J 10/25; B60J 1/1853
See application file for complete search history.

(56) References Cited

U.S. PATENT DOCUMENTS

| | | | | |
|---|---|---|---|---|
| 9,878,599 | B2 * | 1/2018 | Lahnala | B60J 1/1853 |
| 2007/0157522 | A1 * | 7/2007 | Hebert | B60J 1/1853 49/413 |
| 2008/0060275 | A1 * | 3/2008 | Recker | B60J 1/1853 49/408 |
| 2008/0263960 | A1 * | 10/2008 | Murphy | B60J 1/1853 49/408 |

(Continued)

*Primary Examiner* — Daniel J Troy
*Assistant Examiner* — Daniel Alvarez
(74) *Attorney, Agent, or Firm* — Morgan, Lewis & Bockius LLP

(57) ABSTRACT

A flush glass apparatus includes a fixed glass having an opening, an operation glass configured to open and close the opening of the fixed glass, a lower rail configured to slidably support a lower portion of the operation glass, a sealing member provided below the lower rail to seal a gap between an inner surface of the fixed glass and a vehicle body, one or more upper drain holes provided on the lower rail to discharge rainwater on the lower rail to a buffer area between the lower rail and the sealing member, and a drain induction member interposed between the inner surface of the fixed glass and the sealing member and providing a lower drain hole to discharge rainwater in the buffer area to the outside.

14 Claims, 6 Drawing Sheets

(56) References Cited

U.S. PATENT DOCUMENTS

| | | | |
|---|---|---|---|
| 2013/0174488 A1* | 7/2013 | Snider | B60J 1/002 49/70 |
| 2016/0167487 A1* | 6/2016 | Tamarapoo | B60J 1/1853 296/146.16 |
| 2020/0079186 A1* | 3/2020 | Snider | B60J 1/007 |

* cited by examiner

//FLUSH GLASS APPARATUS

CROSS-REFERENCE TO RELATED APPLICATION(S)

This application is based on and claims priority under 35 U.S.C. § 119 to Korean Patent Application No. 10-2020-0014038, filed on Feb. 6, 2020, in the Korean Intellectual Property Office, the disclosure of which is incorporated by reference herein in its entirety.

TECHNICAL FIELD

The disclosure relates to a flush glass device capable of preventing outside noise or outside air from entering the inside of a vehicle through a drainage path.

BACKGROUND

Large passenger vehicles such as RV (Recreational Vehicle) and SUV (Sport Utility Vehicle) are equipped with a flush glass apparatus.

The flush glass apparatus includes a fixed glass having an opening, an operation glass moving in a sliding manner to open and close the opening of the fixed glass, an upper rail and a lower rail installed on an inner surface of the fixed glass to guide the movement of the operation glass, and a locking device locking the operation glass in a closed state or releasing the locking to open the operation glass.

The flush glass apparatus further includes a drainage path provided to discharge rainwater flowing down from the upper rail and the operation glass toward the lower rail to the outside of a vehicle. A conventional drainage path extends from a drain hole provided on the lower rail to the outside of the vehicle.

However, because the drainage path of the flush glass device directly communicates the inside of a vehicle with the outside of the vehicle, noise or air from the outside of the vehicle may enter the inside of the vehicle through the drainage path, and washing water may enter the inside of the vehicle through the drainage path when the vehicle is washed at high pressure.

SUMMARY

It is an aspect of the disclosure to provide a flush glass device capable of preventing outside noise or outside air from entering the inside of a vehicle through a drainage path.

Additional aspects of the disclosure will be set forth in part in the description which follows and, in part, will be obvious from the description, or may be learned by practice of the disclosure.

In accordance with an aspect of the disclosure, a flush glass apparatus includes a fixed glass having an opening, an operation glass configured to open and close the opening of the fixed glass, a lower rail configured to slidably support a lower portion of the operation glass, a sealing member provided below the lower rail to seal a gap between an inner surface of the fixed glass and a vehicle body, one or more upper drain holes provided on the lower rail to discharge rainwater on the lower rail to a buffer area between the lower rail and the sealing member, and a drain induction member interposed between the inner surface of the fixed glass and the sealing member and providing a lower drain hole to discharge rainwater in the buffer area to the outside.

The drain induction member may extend downward from the lower rail.

The drain induction member may include a spacer plate spacing a portion of the sealing member apart from the inner surface of the fixed glass, and a spacer protrusion protruding from the spacer plate to be supported on the inner surface of the fixed glass.

The drain induction member may extend downward from a position spaced apart from positions of the upper drain holes in a longitudinal direction of the lower rail.

The lower drain hole may be provided at a position misaligned with vertical extension lines respectively passing through the upper drain holes.

The vertical extension lines may be perpendicular to or substantially perpendicular to an extending direction of the lower rail or a sliding direction of the operation glass.

In accordance with an aspect of the disclosure, a flush glass apparatus includes: a fixed glass having an opening; an operation glass configured to open and close the opening of the fixed glass; a lower rail configured to slidably support a lower portion of the operation glass; a sealing member provided below the lower rail to seal a gap between an inner surface of the fixed glass and a vehicle body; one or more upper drain holes provided on the lower rail; a buffer area disposed between the lower rail and the sealing member; and a drain induction member interposed between the inner surface of the fixed glass and the sealing member and providing a lower drain hole. The one or more upper drain holes, the buffer area, and the lower drain hole are connected to each other and provide a flow path.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in otherforms. In order to clearly explain the disclosure, parts not related to the description are omitted from the drawings, and the width, length, thickness, etc. of the components may be exaggerated for convenience.

Figure 1:
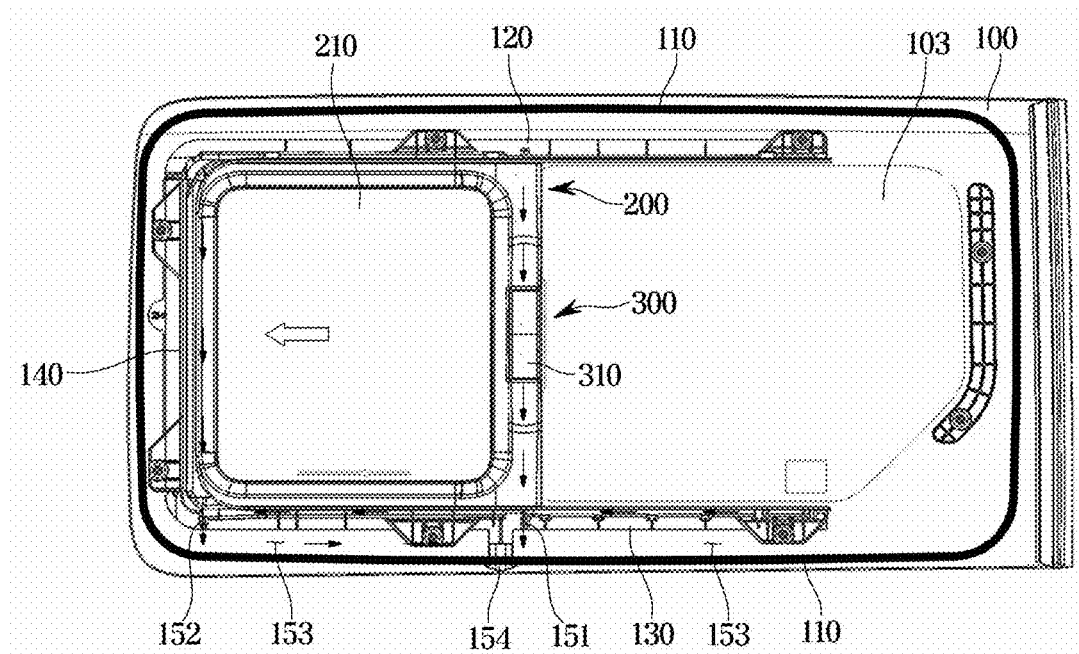
FIG. 1 is a front view of a flush glass apparatus according to an embodiment of the disclosure when an operation glass is closed.
Figure 2:
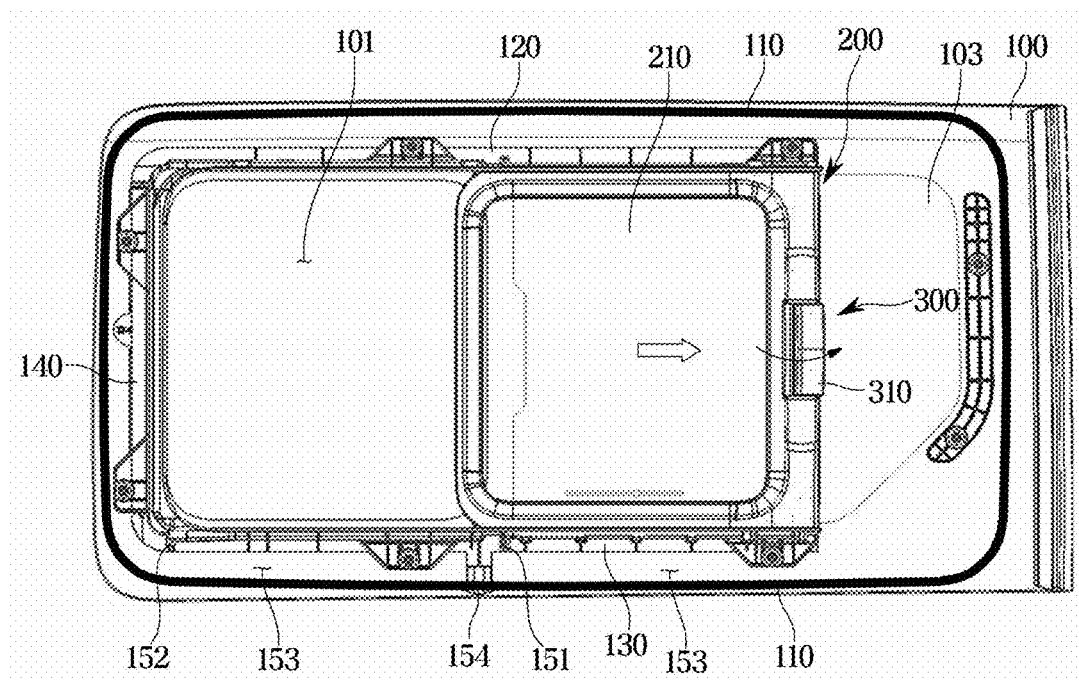
FIG. 2 is a front view of the flush glass apparatus according to an embodiment of the disclosure when the operation glass is opened.
Figure 3:
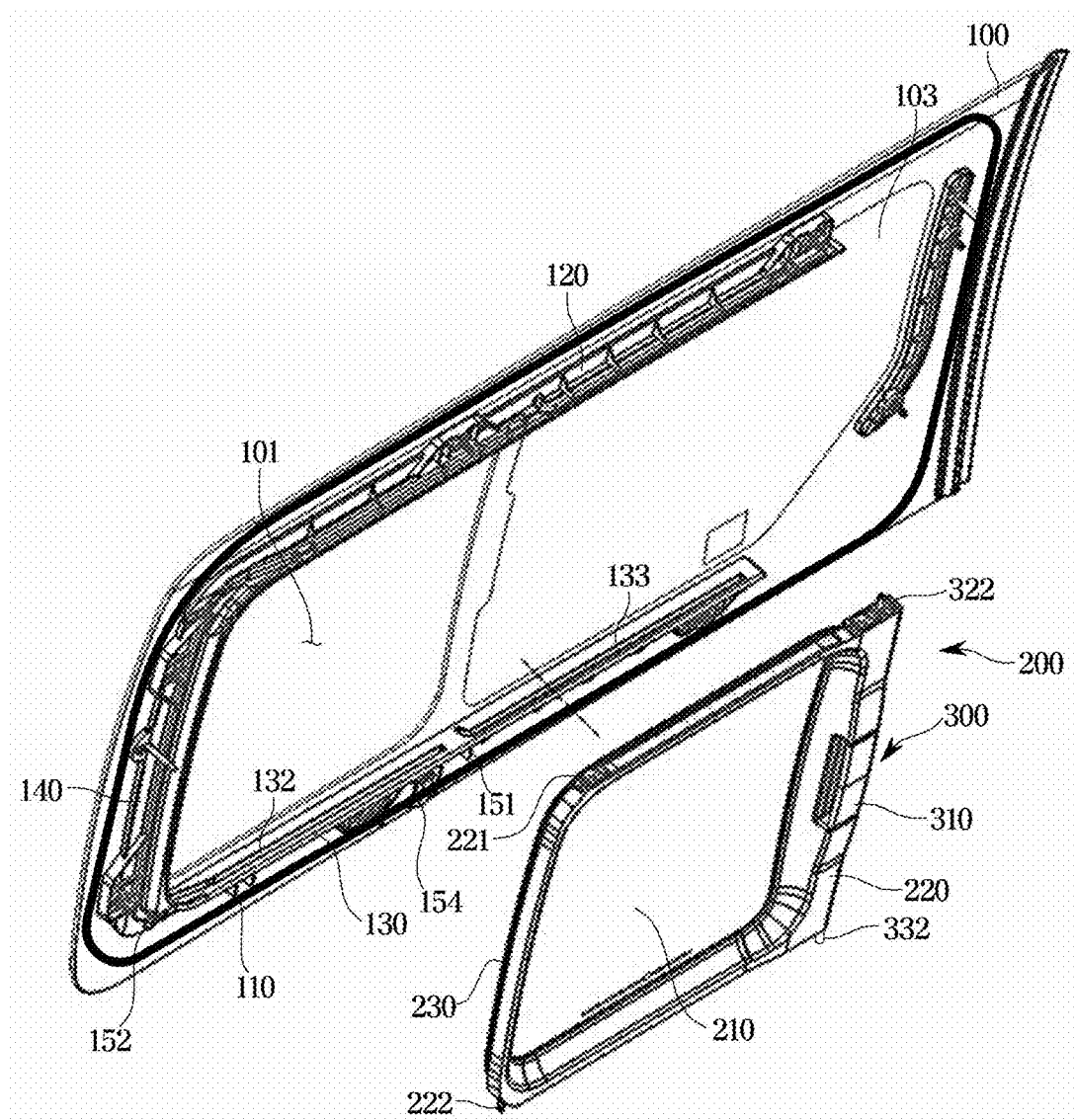
FIG. 3 is a perspective view illustrating a state in which the operation glass of the flush glass apparatus according to an embodiment of the disclosure is separated from a fixed glass.

Referring to FIGS. 1 to 3, a flush glass apparatus according to an embodiment of the disclosure includes a fixed glass 100 provided with an opening 101, an operation glass 200 configured to move in a lateral sliding manner to open and close the opening 101 of the fixed glass 100, and a locking device 300 configured to lock the operation glass 200 in a state of being closed or release the locking to open the operation glass 200.

The fixed glass 100 may be formed in a rectangular panel shape having a long length in a transverse direction. The fixed glass 100 may be mounted in a state in which a rim portion thereof is sealed on a side surface of a vehicle body 170 (see FIG. 6). The fixed glass 100 includes a see-through glass portion 103 and the opening 101 that is opened and closed by the operation glass 200.

A sealing member 110, an upper rail 120, a lower rail 130, and a connection rail 140 may be mounted on an inner surface of the fixed glass 100.

The sealing member 110 is installed along an inner side of the rim portion of the fixed glass 100 to seal a gap between the inner surface of the fixed glass 100 and the vehicle body 170 when the fixed glass 100 is mounted on the vehicle body 170. The sealing member 110 may be installed to be continuously connected along an upper portion of the upper rail 120, a lower portion of the lower rail 130, and a side portion of the connection rail 140.

The upper rail 120 guides a lateral sliding of the operation glass 200 while supporting an upper side of the operation glass 200, and the lower rail 130 guides the lateral sliding of the operation glass 200 while supporting a lower side of the operation glass 200. The upper rail 120 and the lower rail 130 extend long in a sliding direction of the operation glass 200 and are fixed to the inner surface of the fixed glass 100.

The connection rail 140 is mounted on the inner surface of the fixed glass 100 to connect a front end of the upper rail 120 and a front end of the lower rail 130. As illustrated in FIG. 1, the connection rail 140 is coupled to a front end of the operation glass 200 when the operation glass 200 is completely closed so that the sealing of the opening 101 may be maintained.

Referring to FIG. 3, the operation glass 200 includes a see-through glass portion 210, a frame 220 supporting a rim portion of the glass portion 210, and a sealing member 230 coupled to an inner surface of a rim portion of the frame 220.

The rim portion of the glass portion 210 is attached to the frame 220, and the sealing member 230 is mounted on the frame 220 in a form of surrounding an outer side of the glass portion 210. The sealing member 230 seals a gap between the operation glass 200 and the fixed glass 100 while coming into close contact with the inner surface of the fixed glass 100 when the operation glass 200 is closed.

The operation glass 200 includes a front upper locking pin 221 and a rear upper locking pin 322 coupled to the upper rail 120, and a front lower locking pin 222 and a rear lower locking pin 332 coupled to the lower rail 130. The upper rail 120 is provided with a front upper guide groove to which the front upper locking pin 221 is coupled, and a rear upper guide groove to which the rear upper locking pin 322 is coupled.

The lower rail 130 is provided with a front lower guide groove 132 to which the front lower locking pin 222 is coupled, and a rear lower guide groove 133 to which the rear lower locking pin 332 is coupled. Although the drawings do not clearly illustrate the front upper guide groove and the rear upper guide groove of the upper rail 120, they may be provided similar to the front lower guide groove 132 and the rear lower guide groove 133.

The operation glass 200 may slide in opening and closing directions, as the front upper locking pin 221 and the rear upper locking pin 322 are coupled to the front and rear upper guide grooves of the upper rail 120 and the front lower locking pin 222 and the rear lower locking pin 332 are coupled to the front and rear lower guide grooves 132 and 133 of the lower rail 130.

The locking device 300 may include an operation handle 310 installed on the frame 220, and parts mounted in the frame 220 to raise and lower the rear upper locking pin 322 and the rear lower locking pin 332 when the operation handle 310 is operated. The locking device 300 may implement locking or unlocking of the operation glass 200 by raising or lowering the rear upper locking pin 322 and the rear lower locking pin 332 when the operation handle 310 is operated.

As illustrated in FIGS. 1 to 4, the flush glass apparatus includes a drainage path for collecting rainwater flowing into an indoor side through the opening 101 of the fixed glass 100 and discharging the collected rainwater to the outside. The drainage path may be provided on the lower rail 130 and below the lower rail 130 to drain rainwater entering through the opening 101 and flowing down along the operation glass 200.

The drainage path includes one or more upper drain holes 151 and 152 formed on the lower rail 130, a buffer area 153 provided between the lower rail 130 and the sealing member 110 positioned below the lower rail 130, and a lower drain hole 155 formed between the inner surface of the fixed glass 100 and the sealing member 110 to discharge rainwater flowing down to the buffer area 153.

The upper drain holes 151 and 152 may include the front upper drain hole 152 formed on the lower rail 130 to discharge rainwater collected in the front lower guide groove 132 of the lower rail 130 to the buffer area 153, and the rear upper drain hole 151 formed on the lower rail 130 to discharge rainwater collected in the rear lower guide groove 133 of the lower rail 130 to the buffer area 153. Accordingly, rainwater flowing down to the lower rail 130 along an outer surface of the operation glass 200 may be discharged to the buffer area 153 below the lower rail 130 through the upper drain holes 151 and 152.

Figure 4:
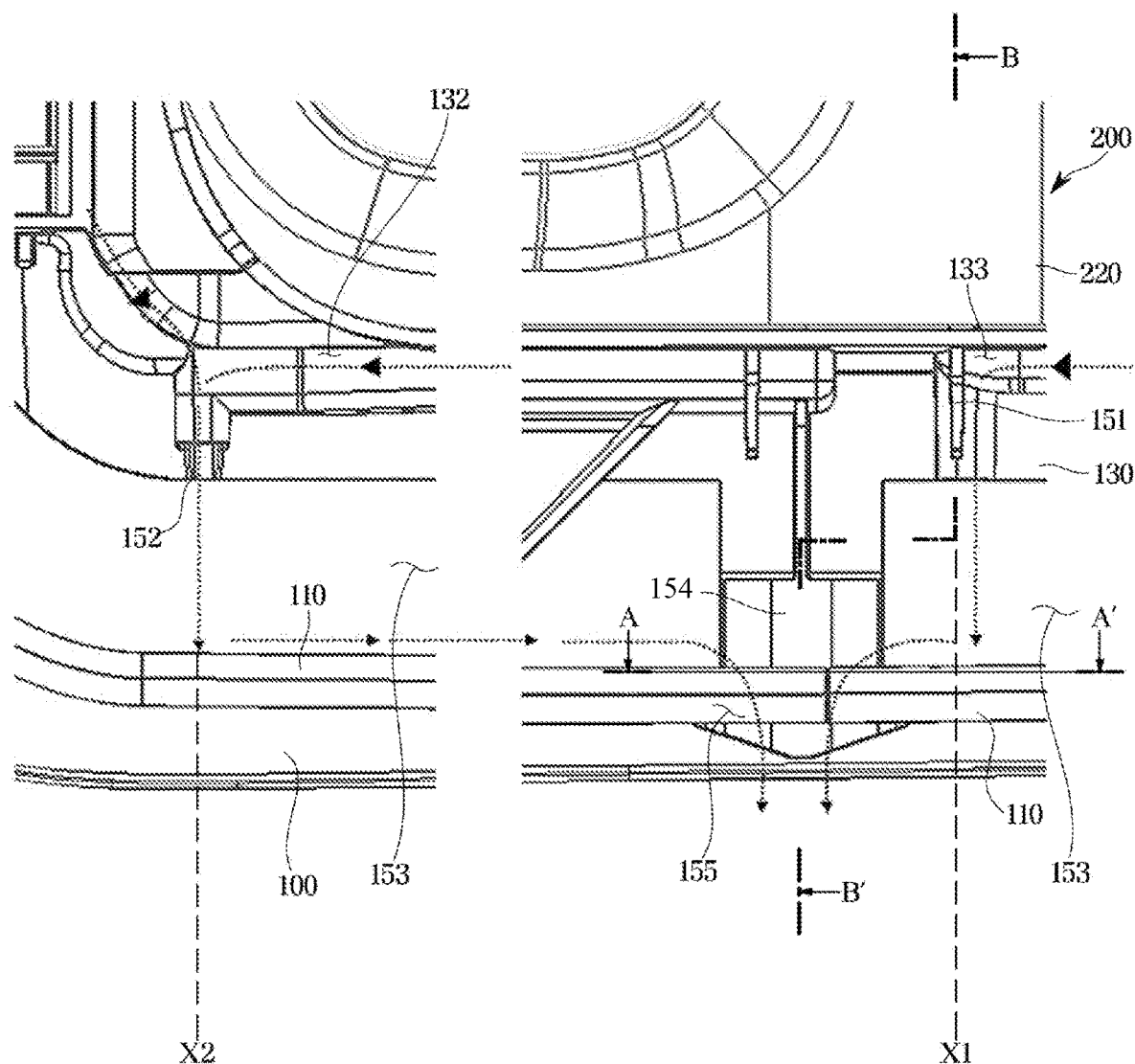
FIG. 4 illustrates a drainage path of the flush glass apparatus according to an embodiment of the disclosure.
Figure 6:
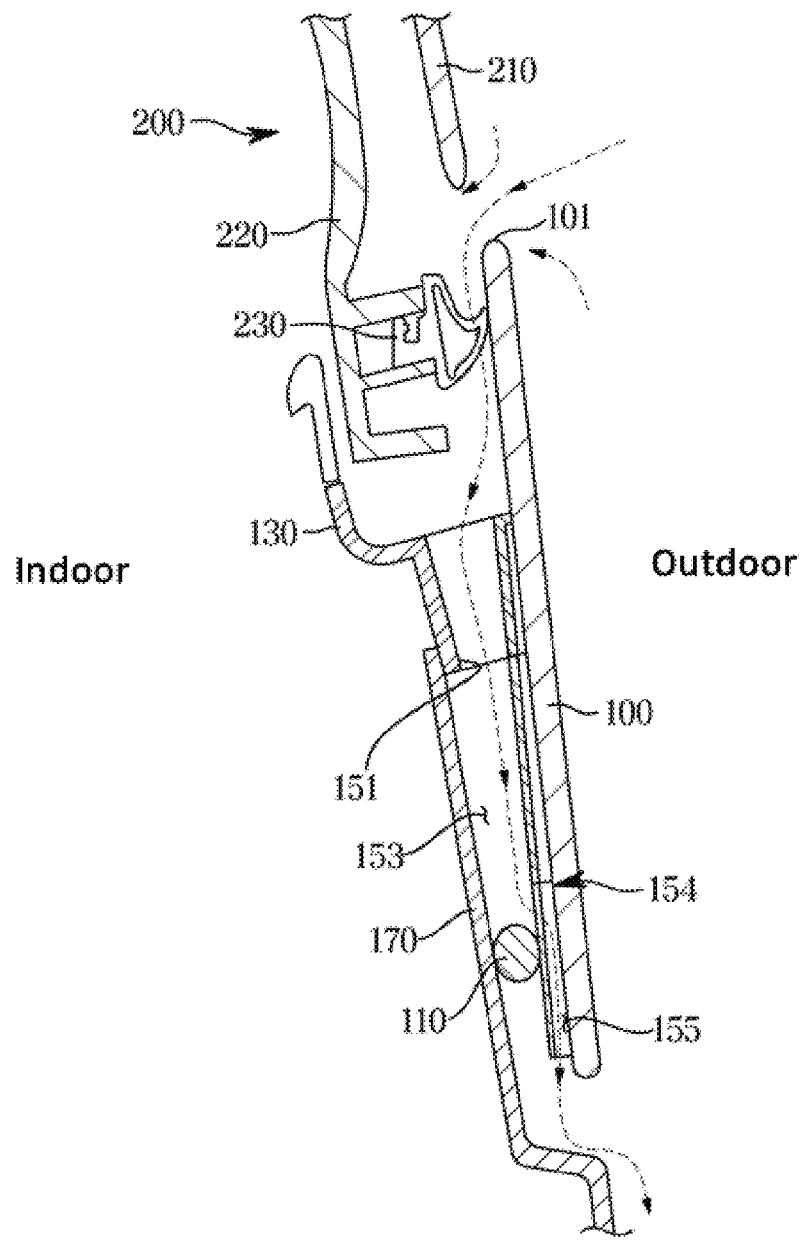
FIG. 6 is a cross-sectional view taken along line B-B' in FIG. 4.

As illustrated in FIGS. 4 and 6, the buffer area 153 is formed of a partitioned space between the lower rail 130 and the sealing member 110 below the lower rail 130. Therefore, rainwater discharged downward through the upper drain holes 151 and 152 may be collected in the buffer area 153 and then flow toward the lower drain hole 155 and be discharged to the outside.

Figure 5:
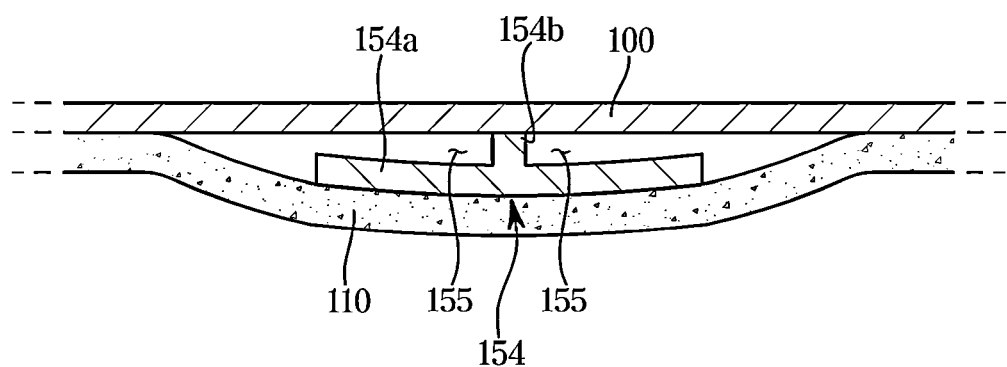
FIG. 5 is a cross-sectional view taken along line A-A' in FIG. 4.

Referring to FIGS. 4 and 5, the lower drain hole 155 may be formed by a drain induction member 154 interposed between the inner surface of the fixed glass 100 and the sealing member 110. The drain induction member 154 may extend downward from the lower rail 130 to form the lower drain hole 155 by separating a portion of the sealing member 110 from the inner surface of the fixed glass 100. That is, the drain induction member 154 may be provided integrally with the lower rail 130.

The drain induction member 154 may include a spacer plate 154a to space a portion of the sealing member 110 apart from the inner surface of the fixed glass 100, and a spacer protrusion 154b protruding from the spacer plate 154a toward the fixed glass 100 to be supported on the inner surface of the fixed glass 100.

The drain induction member 154 may extend downward from a position spaced apart from positions of the upper drain holes 151 and 152 in a longitudinal direction of the lower rail 130. Accordingly, as illustrated in FIG. 4, the lower drain hole 155 may be provided at a position misaligned with vertical extension lines X1 and X2 passing through the upper drain holes 151 and 152. The vertical extension lines X1 and X2 may be perpendicular to an extending direction of the lower rail 130 or a sliding direction of the operation glass 200. The vertical extension lines X1 and X2 may be substantially perpendicular to the extending direction of the lower rail 130 or the sliding direction of the operation glass 200, in consideration of tolerance in manufacturing. Therefore, rainwater discharged downward through the upper drain holes 151 and 152 is not discharged directly to the lower drain hole 155, but is first discharged to the buffer area 153 and then flows toward the lower drain hole 155 along the sealing member 110 and is discharged to the outside through the lower drain hole 155. That is, rainwater discharged to the upper drain holes 151 and 152 may stay in the buffer area 153, and be deflected and flow to the lower drain hole 155 and then be discharged to the outside through the lower drain hole 155.

As such, in the flush glass apparatus according to the present embodiment, the upper drain holes 151 and 152 and the lower drain hole 155 are disposed to be misaligned from each other, and the buffer area is provided to deflect the drainage path between the upper drain holes 151 and 152 and the lower drain hole 155, so that outside noise or outside air may be prevented from entering the inside of a vehicle through the drainage path.

That is, when the drainage path according to this embodiment is applied, even when outside noise enters the inside of a vehicle through the lower drain hole 155, the noise may dissipate in the buffer area 153. The outside air also stays in the buffer area 153 in a process of flowing into the inside through the lower drain hole 155, thereby minimizing the inflow of external air into the inside. Even when washing water flows into the buffer area 153 through the lower drain hole 155 in a high pressure washing process of a vehicle, the washing water may stay in the buffer area 153 and then be discharged to the outside through the lower drain hole 155. Therefore, the inflow of high pressure washing water into the inside may be prevented.

As is apparent from the above, according to a flush glass apparatus of the disclosure, because an upper drain hole of a lower rail and a lower drain hole of a sealing member side are disposed to be misaligned from each other and a buffer area is provided to deflect a drainage path between the upper drain hole and the lower drain hole, outside noise or outside air can be prevented from entering the inside of a vehicle through the drainage path.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and theft equivalents.

What is claimed is:

1. A flush glass apparatus comprising:
a fixed glass having an opening;
an operation glass configured to open and close the opening of the fixed glass;
a lower rail configured to slidably support a lower portion of the operation glass and mounted on the fixed glass;
a sealing member provided below the lower rail to seal a gap between an inner surface of the fixed glass and a vehicle body;
one or more upper drain holes provided on the lower rail to discharge rainwater on the lower rail to a buffer area between the lower rail and the sealing member; and
a drain induction member interposed between the inner surface of the fixed glass and the sealing member, provided integrally with the lower rail, and providing a lower drain hole to discharge rainwater in the buffer area to the outside,
wherein the one or more upper drain holes include a front upper drain hole disposed on a front side in a longitudinal direction of the lower rail, and a rear upper drain hole disposed on a rear side in the longitudinal direction of the lower rail, and
wherein the drain induction member extends downward from the buffer area at a corresponding position between the front upper drain hole and the rear upper drain hole, and
wherein the flush glass apparatus is configured such that the rainwater draining down through the one or more upper drain holes into the buffer area flows along the sealing member towards the drain induction member and is discharged to the outside through the lower drain hole.

2. The flush glass apparatus according to claim 1, wherein the drain induction member extends downward from the lower rail.

3. The flush glass apparatus according to claim 1, wherein the drain induction member comprises a spacer plate spacing a portion of the sealing member apart from the inner surface of the fixed glass, and a spacer protrusion protruding from the spacer plate to be supported on the inner surface of the fixed glass.

4. The flush glass apparatus according to claim 3, wherein the spacer protrusion is spaced apart from the sealing member.

5. The flush glass apparatus according to claim 1, wherein the lower drain hole is provided at a position misaligned with vertical extension lines respectively passing through the one or more upper drain holes.

6. The flush glass apparatus according to claim 5, wherein the vertical extension lines are perpendicular to or substantially perpendicular to an extending direction of the lower rail or a sliding direction of the operation glass.

7. The flush glass apparatus according to claim 1, wherein the flush glass apparatus is configured such that the rainwater draining down through the one or more upper drain holes into the buffer area flows along the sealing member, in a slidable direction of the operation glass, towards the drain induction member.

8. A flush glass apparatus comprising:
a fixed glass having an opening;
an operation glass configured to open and close the opening of the fixed glass;
a lower rail configured to slidably support a lower portion of the operation glass and mounted on the fixed glass;
a sealing member provided below the lower rail to seal a gap between an inner surface of the fixed glass and a vehicle body;
one or more upper drain holes provided on the lower rail;
a buffer area disposed between the lower rail and the sealing member; and
a drain induction member interposed between the inner surface of the fixed glass and the sealing member, provided integrally with the lower rail, and providing a lower drain hole,
wherein the one or more upper drain holes, the buffer area, and the lower drain hole are connected to each other and provide a flow path,
wherein the one or more upper drain holes include a front upper drain hole disposed on a front side in a longitudinal direction of the lower rail, and a rear upper drain hole disposed on a rear side in a longitudinal direction of the lower rail, and wherein the drain induction member extends downward from the buffer area at a corresponding position between the front upper drain hole and the rear upper drain hole, and wherein the flush glass apparatus is configured such that rainwater draining down through the one or more upper drain holes into the buffer area flows along the sealing member towards the drain induction member and is discharged to the outside through the lower drain hole.

9. The flush glass apparatus according to claim 8, wherein the drain induction member extends downward from the lower rail.

10. The flush glass apparatus according to claim 8, wherein the drain induction member comprises a spacer plate spacing a portion of the sealing member apart from the inner surface of the fixed glass, and a spacer protrusion protruding from the spacer plate to be supported on the inner surface of the fixed glass.

11. The flush glass apparatus according to claim 10, wherein the spacer protrusion is spaced apart from the sealing member.

12. The flush glass apparatus according to claim 8, wherein the lower drain hole is provided at a position misaligned with vertical extension lines respectively passing through the one or more upper drain holes.

13. The flush glass apparatus according to claim 12, wherein the vertical extension lines are perpendicular to or substantially perpendicular to an extending direction of the lower rail or a sliding direction of the operation glass.

14. The flush glass apparatus according to claim 8, wherein the flush glass apparatus is configured such that the rainwater draining down through the one or more upper drain holes into the buffer area flows along the sealing member, in a slidable direction of the operation glass, towards the drain induction member.

\* \* \* \* \*